Patented Nov. 5, 1929

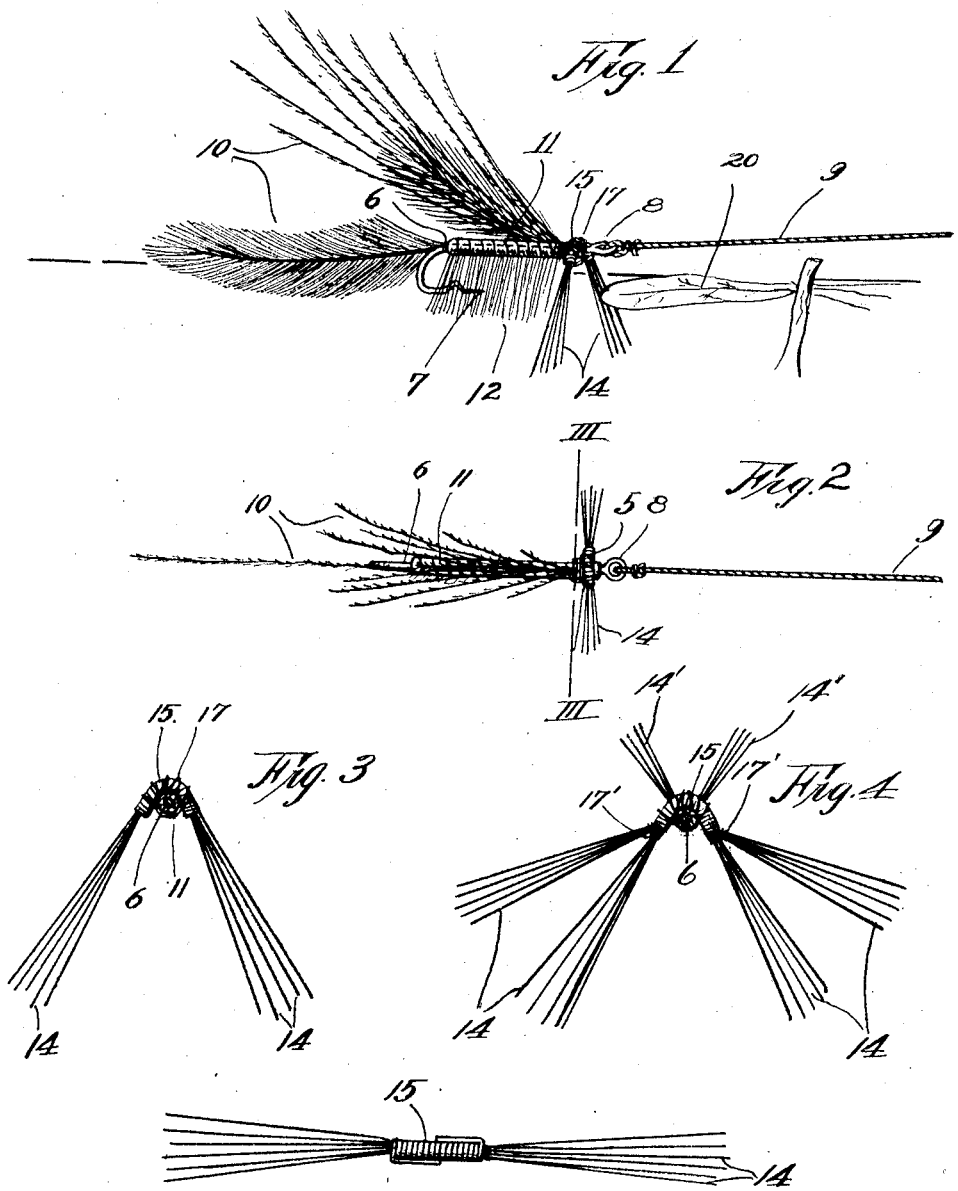

1,734,346

UNITED STATES PATENT OFFICE

GEORGE F. REINHARDT, OF KANSAS CITY, KANSAS

ANIMATOR FOR ARTIFICIAL FLIES FOR LURING GAME FISH

Application filed April 7, 1927. Serial No. 181,701.

The present invention relates to artificial bait, and aims to provide an artificial bait in the form of an artificial fly for luring game fish, the principal object in view being to provide means serving not only as a weed guard for protecting the hook to a certain extent against being caught or snagged, but also as a means adapted, on engagement with any obstructions in the water, to impart an animated action or movement to the fly, in order to simulate a live bait.

For carrying out this object of the invention I provide the hook which carries the artificial fly with suitable projections in the form of bristles or the like, in advance of the point of the hook and projecting laterally at approximately right angles to the point of the hook in position to act as a guard as well as to contact with plants, moss or the like, at such an angle as to readily yield and become disengaged from such obstructions and in so doing impart an animated or lifelike movement to the bait. It is also sought to provide elements of this character having sufficient stiffness to fulfill this desired function of animating the fly, and at the same time offer no objectionable interference with a strike on the part of the game.

With these general objects in view, the invention will now be described by reference to the accompanying drawing illustrating one form of construction which I have found practical for the efficient embodiment of my improvement, after which those features deemed to be novel will be particularly set forth and claimed.

In the drawing—

Figure 1 is a plan view illustrating an artificial bait supplied with the present improvement, and showing the same in operative position with reference to a plant adjacent to the water's surface;

Figure 2 is a plan view of the bait;

Figure 3 is an elevation, representing a section on the line III—III of Figure 2;

Figure 4 is a similar view showing a modified arrangement of the bristle elements constituting the present improvement; and Figure 5 is a plan view showing the bristles and wire coil used for tufting the same, prior to application to the hook.

Referring now to the drawing in detail, this illustrates my improvement as applied to the shank portion 6 of a fish hook formed at one end with a hook 7 and at the other with the eye 8 for attachment of the line 9, as shown in Figures 1 and 2. The shank 6 of the hook is also equipped with suitable feathers 10 which, together with the wrappings 11 about the shank 6, and carrying the hairs 12, combine to form the representation of a fly, adapted to simulate the appearance of a live bait. This simulation is further carried out by the elements of construction comprising my improvement, for which purpose I use a set of filaments or fibers 14, of suitable resilient material, and also preferably of a non-corrosive substance. I have found that horse tail hair fibers answer my purpose satisfactorily, and a suitable number of these are secured together at their mid points by means of a coil of wire 15, also of a non-corrosive character such as copper, and this coil 15 is bent into substantially U-shape, as represented in Figures 1 to 4, and then firmly secured to the shank 6 of the hook adjacent to the eye 8 by means of suitably wrapped threads 17, after which the connection between the hook and this coil 15 is treated to an application of varnish for protective purposes, as well as rendering the connection more secure, and in addition imparting a glossy finish to this portion of the bait. By this means it is apparent that the coil 15 has the effect of simulating the head of the fly, while the bristles 14 have the appearance of antennæ or feelers projecting from the head 15. The flexible character of the wire 15 also permits the bristles 14 to be bent and set at any desired angle, but for my purpose I find that the desired functions are best performed by setting the bristles 14 so as to project laterally (with reference to the plane of the hook) in the various directions shown, and in a plane at substantially right angles to the direction of the point of the hook, as will be clearly understood by a comparison of the views shown in Figures 1 and 2. Thus the bristles are positioned so as to cover a fairly wide range of protection for the point of the hook against moss or other aquatic growth, in the path of movement of the hook, and in Figure 4 I illustrate a modification in which the bristles are more widely spread or separated, additional windings of thread 17' being used to produce additional separated tufts of the bristles, and hence correspondingly increasing the contacting range of the bristles. In this view I also illustrate sets of upwardly-projecting tufts of bristles 14' which may be formed and mounted upon the shank of the hook in the same manner as the bristles 14, and in substantially the same plane as the latter. This serves to further enhance the lifelike appearance of the fly, and also increases the range of action of the bristles and hence their capacity of functioning for all positions of the fly.

It being a primary object of the invention to provide a lure which will induce the fish to strike and serves the double purpose of a weed guard function and a means for animating the lure, without offering any interference with the proper action of the hook in case of a strike, it will be at once seen that the construction herein illustrated completely fulfills this aim of my invention. The bristles 14 are of a character to afford a certain degree of protection to the hook against becoming snagged by plants or other obstructions in the water but without interfering appreciably with the action of the hook in the case of a strike, and in engaging with such obstructions as the leaves 20 of plant growth this engagement is at such an angle and the resiliency of the bristles 14 is such as to allow the bait to glide by, and on disengagement with the obstructions the fly is released with a springing action, having a very noticeable similarity to the action of a live bait. The character and degree of this animated action on the part of the bait may be determined and controlled by the skill of the angler, but this improved construction is such that any novice can operate the bait very successfully with little practice, since a mere slight twitching of the tip of the rod will produce the desired characteristic or animated action on the part of the fly. If any slight adjustment of the position of the bristles should become necessary, this is facilitated by the flexible character of the coil of wire 15 used to attach the bristles to the hook.

While I have illustrated and described what I now regard as the preferred form of construction for embodying my improvement, I desire to reserve the right to make all such changes and modifications as may fairly fall within the scope of the appended claim.

What I claim is:

An animator construction for artificial flies comprising, in combination with a hook carrying an artificial fly, a plurality of comparatively stiff bristles having means for securing the same to the line-attaching end of the shank of the hook with said bristles projecting substantially at right angles to the direction of the point of the hook, said securing means comprising a coil of flexible wire material permitting bending of the same to secure said bristles in various angular positions with reference to the hook.

In witness whereof I hereunto affix my signature.

GEO. F. REINHARDT.